W. ORMSBY.
TRANSOM LIFTER.
No. 11,639. Reissued Nov. 30, 1897.
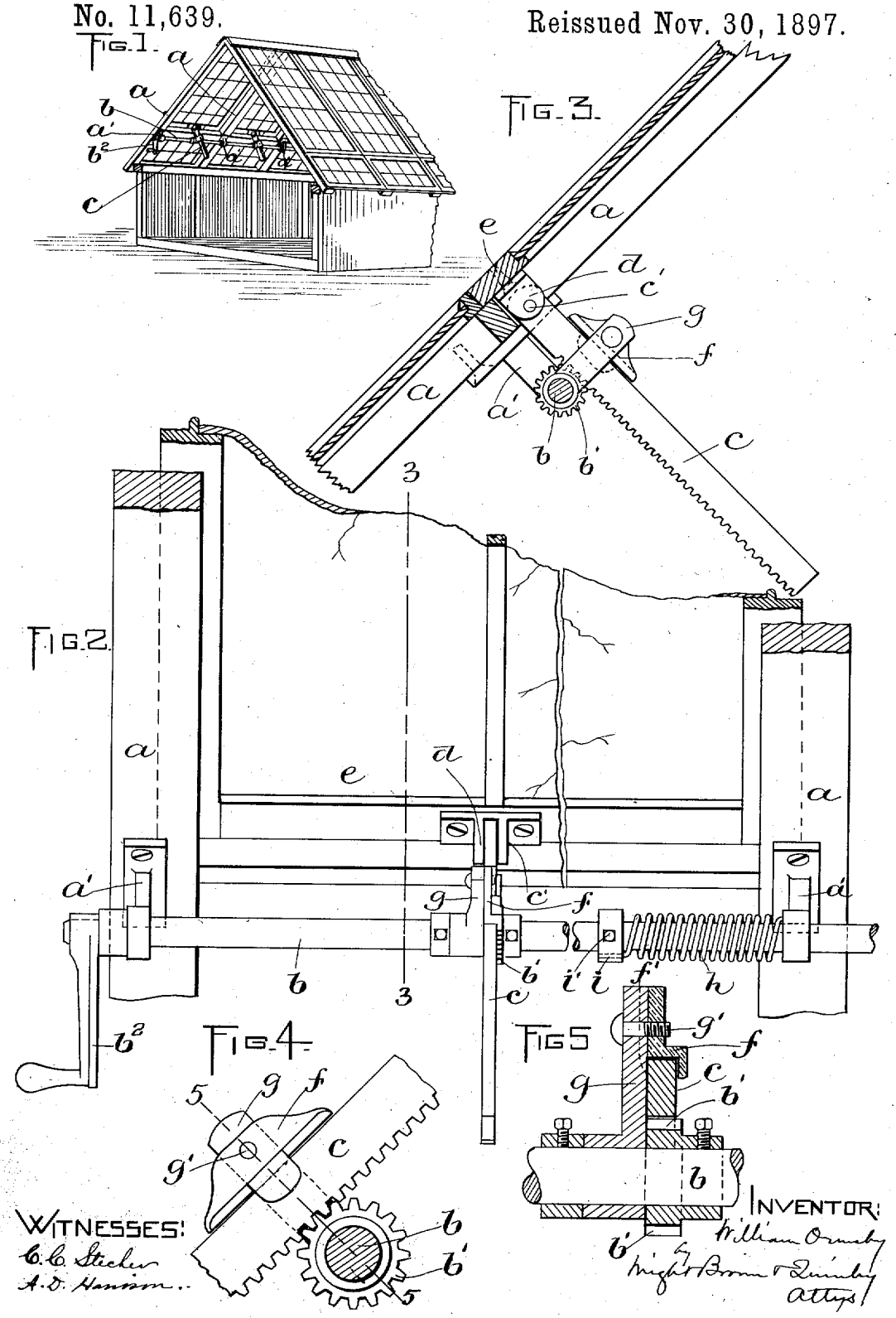

UNITED STATES PATENT OFFICE.

WILLIAM ORMSBY, OF MELROSE, MASSACHUSETTS, ASSIGNOR TO THOMAS GRAY, OF ARLINGTON, MASSACHUSETTS.

TRANSOM-LIFTER.

SPECIFICATION forming part of Reissued Letters Patent No. 11,639, dated November 30, 1897.

Original No. 466,081, dated December 29, 1891. Application for reissue filed July 29, 1897. Serial No. 646,411.

*To all whom it may concern:*

Be it known that I, WILLIAM ORMSBY, of Melrose, in the county of Middlesex and State of Massachusetts, have invented certain new and useful Improvements in Transom-Lifters, of which the following is a specification.

This invention has for its object to provide improved means whereby the swinging sections of the roof of a glass or hot house may be readily operated and caused to open and shut.

Glass or hot houses are often built in long straight sections; and my invention consists in a shaft journaled in suitable bearings on the inner side of the roof and being provided with a pinion at each point where it is designed to operate a swinging section or skylight of the roof, the said pinions meshing with a rack pivotally attached to the said swinging section, said shaft being operated by a crank or in any other suitable way, all of which I will now proceed to describe.

In the accompanying drawings, forming a part of this specification, Figure 1 represents a perspective view of a portion of a glass or hot house. Fig. 2 represents a view of a portion of the roof thereof, looking upward from inside the house, showing my improved operating devices. Fig. 3 represents a section on line 3 3 of Fig. 2, looking toward the right. Fig. 4 represents a side view of a detail, showing the opposite side to that which is shown in Fig. 3. Fig. 5 represents a section on line 5 5 of Fig. 4.

The same letters of reference indicate the same parts in all the figures.

In the drawings, *a a* represent portions of the main frame of the roof of a glass or hot house, which support brackets *a′ a′*, in which the shaft *b* is journaled. The shaft *b* runs longitudinally of the building and is located just inside of the roof thereof, as shown in the drawings. Said shaft is provided at the points where it is desired to operate the skylights or swinging sections of the roof with pinions *b′ b′*. The pinions *b′* mesh with racks *c*, which are pivoted at *c′* to ears or lugs *d*, affixed preferably to the lower end of the skylights or swinging sections *e* of the roof. The rack *c* is kept in gear with the pinion *b′* by means of a shoe or guide *f*, rigidly attached to the outer end of an arm *g* by means of a clamping-screw *g′*, the head of which bears on the rear side of the arm *g*, while its threaded portion is engaged with the shoe *f*. When the screw *g′* is turned tightly home, it binds the parts *f g* together with sufficient firmness to prevent the part *f* from turning loosely on the part *g*. If desired, the parts *f* and *g* may be additionally interlocked to prevent the part *f* from turning loosely by suitable means, such as flanges formed on the edges of the part *f* and projecting over the edges of the part *g*, one of said flanges being indicated by the dotted line *f′* in Fig. 5. The inner end of the arm *g* is formed as a collar surrounding the shaft *b*, as shown in Fig. 5, and loosely secured thereto by means of collars affixed to the shaft, between which collars the arm is adapted to oscillate freely. It will be seen that the described connection of the shoe *f* to the arm *g* and of the arm *g* to the shaft *b* allows the said shoe to press squarely on the upper edge of the rack *c* in whatever position the same may be placed. It is obvious that as the skylight or swinging section is swung outward or open the angle of the rack *c* to said section will be altered, and it becomes necessary, in order to prevent the rack from jamming in the guide *f*, that said guide should also alter its angle. It will be seen that this is provided for by the described connection of the guide *f* to the arm *g* and of the arm to the shaft *b*, as above described.

The shaft *b* may be provided with a crank $b^2$, by which it may be operated, and to assist the operator in raising the skylights *e* to open the same I provide one or more springs *h*, one end of which is affixed to a fixed support, preferably one of the brackets *a′* on the fixed part of the roof, the other end being affixed to the shaft *b* by means of a collar *i*, adapted to be attached to the shaft by a suitable screw *i′*. The stress of the spring is arranged to aid in turning the shaft *b* so as to open the skylights, so as to assist the operator in raising said skylights. I may provide the shaft *b* with any suitable number of said springs *h*. The strength of the springs *h* is so adjusted that the stress of said springs will counterbalance the weight of the hinged windows or sections, so that when the latter have been moved to any given position by a rotation of the shaft $b$ the counterbalancing action of said springs will cause the said windows or sections to remain in said position.

Any other suitable device for rotating the shaft $b$ may be used instead of the crank $b^2$.

It will be seen that by the use of my improved operating devices hereinbefore described one operator is enabled to easily and rapidly open, close, or adjust the swinging sections of the roof of a long glass or hot house, the whole of said skylights being operated simultaneously. It will also be obvious that said skylights may be very nicely adjusted by the use of my improved devices. It will also be seen that said improved devices are of simple construction and are readily attachable to any glass or hot house roof.

Various changes may be made in the construction and arrangement of parts without departing from the nature and spirit of my invention.

It will be obvious that the devices above described may be applied to the hinged windows of buildings other than glass or hot houses.

I claim—

1. As a means for operating a series of hinged windows or skylights, a shaft adapted to rotate in bearings and provided with a series of pinions adapted to engage racks connected to said windows, and a spring engaged with said shaft and with a suitable non-rotating support, said spring being arranged to be compressed by the closure of the windows and to rotate the shaft in the direction required to raise the windows, so that when the shaft is turned to raise the windows the spring assists in the operation, and when the windows are lowered the spring is compressed, the spring acting at all times to counterbalance the windows, as set forth.

2. The combination of a series of hinged windows or skylights $e$, each having a rack pivotally connected to and depending from it, a shaft journaled in fixed bearings and provided with a series of pinions meshing with said racks, and a spring engaged with said shaft and with a suitable fixed support, said spring being arranged to rotate the shaft in the direction required to raise the windows, whereby the windows are counterbalanced and caused to stand at any position to which they may be opened or adjusted by the rotation of the shaft, as set forth.

3. The combination of a hinged window, a rack pivoted to the swinging end thereof, a shaft journaled in fixed bearings and provided with a pinion meshing with said rack, an arm mounted on the shaft and adapted to oscillate freely thereon, and a shoe or guide rigidly connected to the outer end of said swinging arm and formed to bear on the back of the rack and hold the teeth thereof in engagement with the pinion, as set forth.

In witness whereof I have signed my name to this specification, in the presence of two subscribing witnesses, this 16th day of July, 1897.

WILLIAM ORMSBY.

Witnesses:
EVA M. ORMSBY,
H. M. SYLVESTER.